US009529711B2

(12) United States Patent
Fu

(10) Patent No.: US 9,529,711 B2
(45) Date of Patent: Dec. 27, 2016

(54) METHOD AND APPARATUS FOR AUTOMATIC SYSTEM CLEANING, AND STORAGE MEDIUM

(71) Applicant: TENCENT TECHNOLOGY (SHENZHEN) COMPANY LIMITED, Shenzhen, Guangdong (CN)

(72) Inventor: Qikang Fu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 393 days.

(21) Appl. No.: 14/063,402

(22) Filed: Oct. 25, 2013

(65) Prior Publication Data
US 2014/0089355 A1  Mar. 27, 2014

Related U.S. Application Data

(63) Continuation of application No. PCT/CN2013/080130, filed on Jul. 25, 2013.

(30) Foreign Application Priority Data

Jul. 25, 2012 (CN) .......................... 2012 1 0259697

(51) Int. Cl.
*G06F 12/02* (2006.01)
*G06F 17/30* (2006.01)

(52) U.S. Cl.
CPC ..... *G06F 12/0253* (2013.01); *G06F 17/30115* (2013.01)

(58) Field of Classification Search
CPC .................. G06F 12/0253; G06F 17/30115
(Continued)

(56) References Cited

U.S. PATENT DOCUMENTS 3,423,568 A * 1/1969 Vonderhaar .......... C11D 3/0057
126/21 R
5,168,599 A * 12/1992 Williams .................. A47L 5/14
15/320

(Continued)

FOREIGN PATENT DOCUMENTS

| CN | 1920828 A | 2/2007 |
| CN | 102279892 A | 12/2011 |
| CN | 102332005 A | 1/2012 |

OTHER PUBLICATIONS

Chiang et al., "Managing Flash Memory in Personal Communication Devices", In Proceedings of 1997 IEEE International Symposium on Consumer Electronics, Dec. 2-4, 1997, pp. 177-182.*

(Continued)

*Primary Examiner* — Phuong Thao Cao
(74) *Attorney, Agent, or Firm* — Tim Tingkang Xia, Esq.; Locke Lord LLP

(57) ABSTRACT

The invention relates to a method and an apparatus for automatic system cleaning, and a storage medium. The method includes obtaining a triggering occasion and a triggering condition which are selected by a user; determining whether the triggering occasion and the triggering condition are satisfied; and if yes, cleaning a system according to a preset running manner and a preset running policy. Through combination of system cleaning functions and scheduled task functions, and expansion of existing triggering conditions of a tasks scheduler, a user can self-define a triggering occasion, a triggering condition, a running manner and a running policy of system cleaning. When the triggering occasion and the triggering condition designated by the user are satisfied, system cleaning is automatically performed according to the selected running manner and policy, thereby improving the system performance and the (Continued)

system cleaning efficiency, and protecting the computer security and the individual privacy.

12 Claims, 4 Drawing Sheets

(58) Field of Classification Search
USPC .......................................................... 707/813
See application file for complete search history.

(56) References Cited

U.S. PATENT DOCUMENTS

| | | | | |
|---|---|---|---|---|
| 5,586,285 A * | 12/1996 | Hasbun | ................ | G06F 3/0601 711/100 |
| 5,822,781 A * | 10/1998 | Wells | .................... | G06F 3/0625 703/23 |
| 5,881,292 A * | 3/1999 | Sigal | ........................ | G06F 8/71 707/999.2 |
| 5,894,832 A * | 4/1999 | Nogi | ........................ | F02D 9/10 123/179.15 |
| 6,453,430 B1 * | 9/2002 | Singh | .................. | G06F 11/0715 712/227 |
| 6,543,459 B1 * | 4/2003 | Annapragada | ...... | C23C 16/4405 134/1.1 |
| 6,632,973 B1 * | 10/2003 | Miyake | .................... | A62D 3/38 210/762 |
| 6,877,098 B1 * | 4/2005 | Lavelle | ................. | G06F 1/3203 713/320 |
| 6,980,518 B1 * | 12/2005 | Sun | ..................... | H04L 12/1868 370/235 |
| 7,069,279 B1 * | 6/2006 | Rau | ........................ | G06F 9/5016 |
| 7,181,511 B1 * | 2/2007 | Grenier | ................. | G06F 9/4411 701/36 |
| 7,187,689 B1 * | 3/2007 | Gupta | .................... | H04L 49/557 370/429 |
| 7,565,497 B1 * | 7/2009 | Garthwaite | ......... | G06F 12/0269 711/158 |
| 7,788,537 B1 * | 8/2010 | Yellen | ................. | G06F 11/0727 714/38.11 |
| 8,041,893 B1 * | 10/2011 | Fung | ................... | G06F 11/3466 711/118 |
| 8,082,342 B1 * | 12/2011 | Stolboushkin | ....... | H04L 12/2602 709/203 |
| 8,560,709 B1 * | 10/2013 | Shokhor | ................. | H04L 63/20 709/203 |
| 8,635,422 B1 * | 1/2014 | Kaliannan | ............. | G06F 3/0608 711/170 |
| 8,707,018 B1 * | 4/2014 | Hooker | .................. | G06F 9/4411 713/1 |
| 2002/0095408 A1 * | 7/2002 | Cheng | ............... | G06F 17/30595 |
| 2002/0116652 A1 * | 8/2002 | Chen | .................... | G06F 1/3228 713/300 |
| 2002/0138762 A1 * | 9/2002 | Horne | ................. | H04L 12/2602 726/25 |
| 2003/0058299 A1 * | 3/2003 | Endo | .................... | B41J 2/16579 347/23 |
| 2004/0150678 A1 * | 8/2004 | Jeong | ................. | G09G 5/003 715/867 |
| 2004/0252888 A1 * | 12/2004 | Bargeron | ............. | G06K 9/222 382/188 |
| 2005/0071702 A1 * | 3/2005 | Morisawa | ............. | G06F 1/3203 713/320 |
| 2005/0080866 A1 * | 4/2005 | Kent, Jr. | .............. | G06Q 10/107 709/207 |
| 2005/0114643 A1 * | 5/2005 | Bryant-Rich | ....... | G06F 9/44584 713/1 |
| 2005/0229338 A1 * | 10/2005 | Kashiwagi | ............. | A47L 9/2805 15/1 |
| 2006/0048800 A1 * | 3/2006 | Rast | ........................ | A47L 1/02 134/56 R |
| 2006/0130648 A1 * | 6/2006 | Altman | ................ | B03C 3/68 95/57 |
| 2007/0067843 A1 * | 3/2007 | Williamson | .......... | G06F 21/568 726/24 |
| 2007/0143247 A1 * | 6/2007 | Brunswig | ......... | G06F 17/30557 |
| 2007/0156897 A1 * | 7/2007 | Lim | ........................ | H04L 63/20 709/225 |
| 2007/0174289 A1 * | 7/2007 | Utiger | ............... | G06F 17/30424 |
| 2007/0294756 A1 * | 12/2007 | Fetik | ....................... | G06F 21/552 726/11 |
| 2007/0298933 A1 * | 12/2007 | Long | ........................ | F16H 61/02 477/149 |
| 2008/0014934 A1 * | 1/2008 | Balasubramanian | . | H04W 48/16 455/434 |
| 2008/0015878 A1 * | 1/2008 | Feng | ........................ | G06Q 30/02 705/1.1 |
| 2008/0060080 A1 * | 3/2008 | Lim | ........................ | H04L 63/20 726/26 |
| 2008/0295492 A1 * | 12/2008 | Karkkainen | ............ | F01N 3/025 60/286 |
| 2009/0023229 A1 * | 1/2009 | Matsushita | ....... | H01L 21/67253 438/7 |
| 2009/0044272 A1 * | 2/2009 | Jarrett | .................... | G06F 21/568 726/23 |
| 2009/0097202 A1 * | 4/2009 | Gipson | .............. | B01D 46/0067 361/695 |
| 2009/0133718 A1 * | 5/2009 | Lebold | ..................... | B08B 3/00 134/18 |
| 2009/0138573 A1 * | 5/2009 | Campbell | ............. | G06F 21/554 709/218 |
| 2009/0234623 A1 * | 9/2009 | Germain | ................. | E21B 41/00 703/6 |
| 2009/0317123 A1 * | 12/2009 | Noguchi | .............. | G03G 15/161 399/101 |
| 2009/0327592 A1 * | 12/2009 | Chang | ................. | G06F 12/0246 711/103 |
| 2010/0017447 A1 * | 1/2010 | Jones | .................... | G06F 12/0269 707/E17.002 |
| 2010/0017584 A1 * | 1/2010 | Jones | .................... | G06F 11/3612 712/227 |
| 2010/0070978 A1 * | 3/2010 | Chawla | ................. | G06F 9/5077 718/105 |
| 2010/0071064 A1 * | 3/2010 | Weber | .................... | G06F 21/564 726/24 |
| 2010/0107785 A1 * | 5/2010 | Kugimiya | .............. | G01N 33/02 73/865.7 |
| 2010/0235904 A1 * | 9/2010 | Ikeda | .................... | G06F 21/608 726/16 |
| 2010/0242109 A1 * | 9/2010 | Lee | .................... | G06F 17/30144 726/22 |
| 2010/0251370 A1 * | 9/2010 | Sun | ..................... | H04L 63/1416 726/23 |
| 2010/0275049 A1 * | 10/2010 | Balakrishnan | ........ | G06F 1/3203 713/324 |
| 2011/0022641 A1 * | 1/2011 | Werth | ..................... | H04L 67/34 707/803 |
| 2011/0087459 A1 * | 4/2011 | Zazovsky | ............... | E21B 49/10 702/179 |
| 2011/0087899 A1 * | 4/2011 | Fetik | ....................... | G06F 21/552 713/193 |
| 2011/0098053 A1 * | 4/2011 | Widegren | ............... | H04W 8/26 455/450 |
| 2011/0148210 A1 * | 6/2011 | Cherukupalli | .... | H01L 31/02021 307/77 |
| 2011/0151504 A1 * | 6/2011 | Avantsa | .................. | G01N 1/312 435/40.5 |
| 2011/0173223 A1 * | 7/2011 | Chitturi | ................ | G06Q 10/107 707/769 |
| 2011/0202858 A1 * | 8/2011 | Coenen | .................. | G06F 3/048 715/765 |
| 2011/0244838 A1 * | 10/2011 | Chang | ............... | H04M 1/274516 455/414.1 |
| 2012/0078857 A1 * | 3/2012 | Haiby | ............... | G06F 17/30303 707/692 |
| 2012/0185585 A1 * | 7/2012 | Bhate | ............... | H04L 63/1458 709/224 |
| 2012/0255577 A1 * | 10/2012 | Henry | ............... | H01L 21/02052 134/10 |

(56) References Cited

U.S. PATENT DOCUMENTS

| | | | | |
|---|---|---|---|---|
| 2012/0260193 A1* | 10/2012 | Ahiakpor | ............ | G06Q 10/1097 715/752 |
| 2013/0007073 A1* | 1/2013 | Varma | .................. | G06F 12/0253 707/813 |
| 2013/0007371 A1* | 1/2013 | Hilerio | ................ | G06F 12/0866 711/133 |
| 2013/0103973 A1* | 4/2013 | Werth | .................... | G06F 9/4446 714/2 |
| 2013/0138912 A1* | 5/2013 | Bux | .................... | G06F 12/0646 711/170 |
| 2013/0139847 A1* | 6/2013 | Moore | ....................... | B08B 1/00 134/6 |
| 2013/0213443 A1* | 8/2013 | Garcia | ....................... | A61L 2/07 134/99.2 |
| 2014/0052892 A1* | 2/2014 | Klein | ................ | G06F 12/0246 711/103 |
| 2014/0089355 A1* | 3/2014 | Fu | ..................... | G06F 17/30115 707/813 |
| 2014/0165713 A1* | 6/2014 | Frey | ....................... | G01N 33/24 73/64.56 |
| 2014/0189063 A1* | 7/2014 | Carriero | .............. | H04L 67/1095 709/219 |
| 2014/0215129 A1* | 7/2014 | Kuzmin | .............. | G06F 12/0246 711/103 |
| 2014/0281127 A1* | 9/2014 | Marcu | ................. | G06F 12/0246 711/103 |
| 2014/0324789 A1* | 10/2014 | Saner | ................ | G06F 17/30303 707/692 |
| 2014/0379933 A1* | 12/2014 | Morin | ..................... | H04L 67/14 709/228 |
| 2015/0017901 A1* | 1/2015 | Pfohl | ..................... | F01P 5/043 454/141 |

OTHER PUBLICATIONS

State Intellectual Property Office of P. R. China (ISA/CN), "International Search Report", for International application No. PCT/CN2013/080130 filed on Jul. 25, 2013, mailing date as of Nov. 7, 2013.

* cited by examiner

METHOD AND APPARATUS FOR AUTOMATIC SYSTEM CLEANING, AND STORAGE MEDIUM

CROSS-REFERENCE TO RELATED APPLICATION

This application is a continuation application of International Patent Application No. PCT/CN2013/080130, filed Jul. 25, 2013, which itself claims the priority to Chinese Patent Application No. 201210259697.5, filed Jul. 25, 2012 in the State Intellectual Property Office of P.R. China, which are hereby incorporated herein in their entireties by reference.

FIELD OF THE INVENTION

The present invention relates generally to the field of computer technologies, and more particularly to a method and an apparatus for automatic system cleaning, and a storage medium.

BACKGROUND OF THE INVENTION

Generally, during system running, a computer continuously generates system trashes, use traces, and disk fragments, and many plug-ins are further added into software. If the computer is running for a long time without performing system cleaning, the system performance of the computer will be influenced.

Currently, much software is provided with a system cleaning function, which is used to help a user complete system cleaning. For example, a built-in tasks scheduler of Window XP, Window 7, Window 8 or the like can arrange, in a designated triggering occasion, any scripts, programs or documents to be run at a convenient time.

However, cleaning functions of a majority of system cleaning software mostly need to be triggered through a user operation, or can only be run at limited particular moments such as start-up and running, so not only is the system cleaning efficiency reduced, but also the whole performance of the system cannot be effectively improved.

Therefore, a heretofore unaddressed need exists in the art to address the aforementioned deficiencies and inadequacies.

SUMMARY OF THE INVENTION

One of the objectives of the present invention is to provide a method and an apparatus for automatic system cleaning, and a storage medium, so as to improve the system cleaning efficiency and the system performance.

In one aspect of the present invention, the method for automatic system cleaning, includes obtaining a triggering occasion and a triggering condition which are selected by a user; determining whether the triggering occasion and the triggering condition are satisfied; and if yes, cleaning a system according to a preset running manner and a preset running policy.

In another aspect of the present invention, the apparatus for automatic system cleaning, includes an obtaining module, configured to obtaining a triggering occasion and a triggering condition which are selected by a user; a determining module, configured to determining whether the triggering occasion and the triggering condition are satisfied; and a cleaning module, configured to cleaning, when the triggering occasion arrives and the triggering condition is satisfied, a system according to a preset running manner and a preset running policy.

In yet another aspect, the present invention relates to a non-transitory computer-readable medium storing instructions that enable a computer to run, which, when executed by one or more processors of the computer, cause an apparatus to perform a method for automatic system cleaning. The method includes obtaining a triggering occasion and a triggering condition which are selected by a user; determining whether the triggering occasion and the triggering condition satisfied; and if yes, cleaning a system according to a preset running manner and a preset running policy.

According to the present invention, through combinations of system cleaning functions and scheduled task functions, and expansions of existing triggering conditions of a tasks scheduler, a user can self-define a triggering occasion, a triggering condition, a running manner and a running policy of system cleaning. When the triggering occasion and the triggering condition designated by the user are satisfied, system cleaning is automatically performed according to the selected running manner and running policy, thereby saving the disk space of the computer, improving the system performance and the system cleaning efficiency, and protecting the computer security and the individual privacy.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
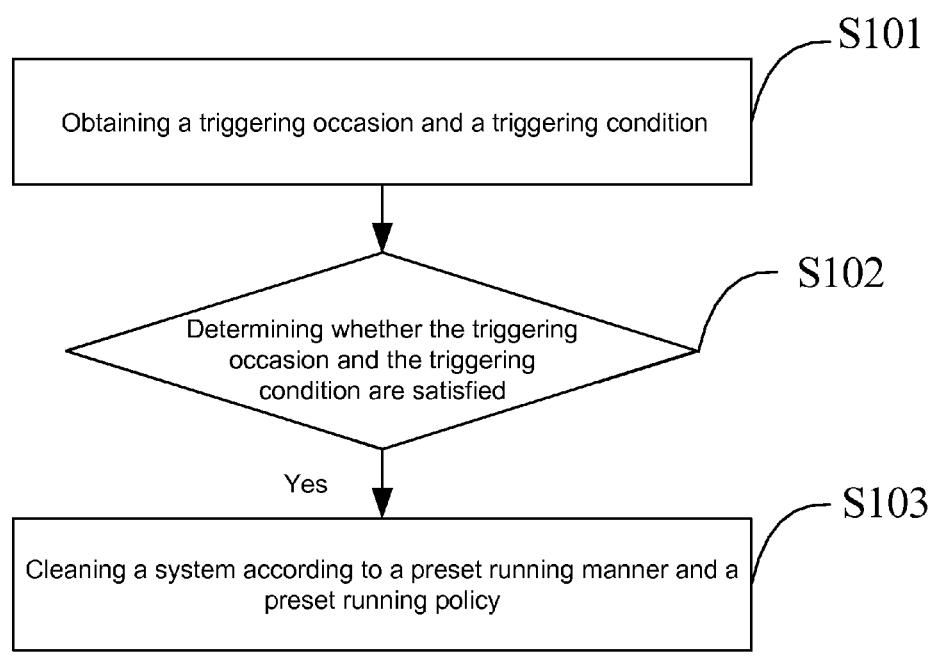
FIG. 1 is a schematic flow chart of a method for automatic system cleaning according to one embodiment of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the embodiments of the present invention in conjunction with the accompanying drawings in FIGS. 1-4. It should be understood that specific embodiments described herein are merely intended to explain the present invention, but not intended to limit the present invention. In accordance with the purposes of this invention, as embodied and broadly described herein, this invention, in one aspect, relates to a method and an apparatus for automatic system cleaning, and a storage medium.

The present invention, among other things, provides a solution of system cleaning as follows: a user chooses to self-define a triggering occasion, a triggering condition, a running manner and a running policy of system cleaning, and when the triggering occasion and the triggering condition designated by the user are satisfied, the system cleaning is automatically completed according to the selected running manner and running policy, so that the computer can run with security and high performance, and the disk space is saved.

Referring to FIG. 1, a method for automatic system cleaning is shown according to a first embodiment of the present invention. The method includes the following steps.

At step S101: Obtaining a triggering occasion and a triggering condition which are selected by a user.

In this embodiment, a system cleaning function is combined with a scheduled task function, and an existing triggering condition of a tasks scheduler is expanded, so the user can self-define and select a triggering occasion, a triggering condition, a running manner and a running policy of system cleaning.

The system presets several types of triggering occasions, triggering conditions, running manners and running policies for the user to choose.

The triggering occasions to be selected by the user include, but not limited to, at time when the system is started, at time after the system starting is completed, in several time intervals after the system starting is completed, before power-off, at a designated time point or period of time, and in a designated running time interval. The system cleaning is run according to the triggering occasion selected by the user.

Specifically, running at the time when the system is started includes: triggering at occasions such as time of starting after the user starts up, time after re-login after user logout, and time after switching the user to log in.

Running at the time after the system starting is completed includes: triggering at the time when the system starting is already completed, namely, triggering at the time after items such as the system startup service and the system starting are already completed.

Running in several time intervals after the system starting is completed includes: triggering after several seconds, minutes or hours after the system starting is completed.

Running before power-off includes: triggering system cleaning before system power-off or restart.

Running at a designated time point includes: running at one or more designated time points in a day, such as running at 7:20 AM.

Running at a designated running time interval includes: running every several seconds, minutes, hours or days.

Moreover, a period of time can be further designated for running, such as running on a certain designated day or several certain designated days of every week, and running on a day of the week of every week; or running on a certain designated day or several certain designated days of every month, such as running on a date of every month.

The user can select one or more of the foregoing triggering occasions to trigger system cleaning.

The triggering condition selected by the user can include: whether the system is idle and whether the cleaning point condition is satisfied.

The cleaning point in the system cleaning includes, but not limited to, trashes, traces, plug-ins and disk fragments in the system.

Cleaning of the trashes refers to that: a computer generally automatically generates a temporary file or temporary information during use, such as a temporary file and an invalid shortcut of the system and the browser, and the useless or ineffective file or registry information is generally referred to as a system trash. When system trashes are excessive due to accumulation over a long period, the computer running speed is slowed down, the available space on the magnetic disk is reduced, and sometimes, normal running of the system or other software is even influenced, so it is required to clean these system trashes at regular intervals, so as to improve the system performance.

Cleaning of the traces refers to that: in a computer running procedure, for convenience of reuse of the user, the system or program frequently automatically stores historical records of user operations, such as a browsed webpage, a seen movie program, and an edited or opened document, and these records are use traces of the user. The use traces may contain individual privacy information of the user, and once another person uses the computer of the user, the individual privacy of the user may be obtained through the historical use traces. Therefore, cleaning of use traces at regular intervals can effectively protect the individual privacy, and prevent another person from understanding the Internet access operation of the user according to the use traces.

Cleaning of the plug-ins refers to that: in a computer system, certain software needs support of some plug-ins, the plug-ins are various, a standard plug-in facilitates use of a software function, while a malicious plug-in influences the software performance to a slight extent, and damages or controls, as a Trojan horse or a virus, the computer system to a serious extent. A malicious plug-in or a designated plug-in which the user does not need in the system is cleaned, so as to ensure security of the computer and the individual information.

Cleaning of the disk fragments refers to that: fragments and messy files generated by the computer magnetic disk during long-term use are rearranged through system software or professional disk fragment arrangement software, so as to release more disk spaces, and the whole performance and the running speed of the computer can be improved.

In this embodiment, the triggering condition for whether the system is idle can be set in the following manner.

If the system conforms to one or more of the following conditions in a designated time length, it can be considered that the system is idle: no mouse operation occurs, no keyboard operation occurs, the CPU occupancy rate is stable and tends to be smooth or is lower than a designated percentage, the memory occupancy rate is lower than a designated percentage, and the system IO occupancy rate is lower than a designated percentage. The designated percentage can be set according to an actual situation.

In one embodiment, the triggering condition for the cleaning point condition can be set in the following manner.

For a trash, if the number of trash files in a certain path satisfies a designated number, or the size of the trash files in the certain path satisfies a designated value, cleaning is triggered; or if certain designated software is exited, cleaning is triggered. For a trace, if the number of use traces reaches a certain number, cleaning is triggered; or if certain software is exited, cleaning is triggered. For a plug-in, if certain software is exited, cleaning is triggered. For disk fragments, if the occupancy rate of the number of fragments and the fragment space at a certain designated drive for a magnetic disk reaches a designated value, disk cleaning is triggered.

The user can select one or two of the foregoing triggering conditions.

Therefore, the user can self-define and select the triggering occasion and the triggering condition according to individual needs, designate a corresponding triggering occasion and a corresponding triggering condition, and can also select a default triggering occasion and a cleaning triggering condition recommended by the system.

At step S102: Determining whether the triggering occasion and the triggering condition are satisfied; and if yes, executing step S103 as described below.

The determination of a triggering occasion of system cleaning can be performed according to a triggering occasion designated by the user, and if the user selects several of the foregoing triggering occasions, the determination can be made according to the sequences of the triggering occasions during the determination.

For example, if the user designates a triggering occasion before system starting, running and power-off, it can be first determined whether the triggering occasion arrives at the time when the system is started; if the triggering occasion is satisfied, a triggering action is generated, and then determination is performed according to the triggering occasion designated by the user during system running, namely, at the time after the system starting is completed; if the condition is satisfied, a triggering action is generated.

As described above, in this embodiment, the triggering condition selected by the user can include: whether the system is idle and whether the cleaning point condition is satisfied.

Whether the system is idle and whether the cleaning point condition is satisfied can both be determined by scanning the system at a fixed time interval, namely, judge whether the user designated condition is satisfied according to a scanning result.

For determining whether the system is idle: first, the system is scanned at a fixed time interval; and when the system conforms to one or more of the following conditions in a predetermined time length, it is determined that the system is idle.

The foregoing conditions include that: no mouse operation occurs, no keyboard operation occurs, the CPU occupancy rate is stable and tends to be smooth or is lower than a predetermined percentage, the memory occupancy rate is lower than a predetermined percentage, and the system IO occupancy rate is lower than a predetermined percentage.

For determining whether the cleaning point condition is satisfied: first, the system is scanned at a fixed time interval; and then whether the user designated condition is satisfied is determined according to a scanning result, and the designated condition includes the following content.

For a trash, if the number of trash files in a certain path satisfies a designated number, or the size of the trash files in the certain path satisfies a designated value, cleaning is triggered; or if certain designated software is exited, cleaning is triggered. For a trace, if the number of use traces reaches a certain number, cleaning is triggered; or if certain software is exited, cleaning is triggered. For a plug-in, if certain software is exited, cleaning is triggered. For disk fragments, if the occupancy rate of the number of fragments and the fragment space at a certain designated drive for a magnetic disk reaches a designated value, disk cleaning is triggered.

The determination sequence of cleaning points such as a trash, a trace, a plug-in and a disk fragment can be set according to actual needs. For example, first whether the trash cleaning point condition satisfies the requirement can be determined, and then whether the trace cleaning point condition, the plug-in cleaning point condition and the disk fragment cleaning point condition satisfies the requirement are determined in sequence. Moreover, the specific determination can be further completed in combination with a counter and a timer.

At step S103: Cleaning a system according to a preset running manner and a preset running policy.

When the triggering occasion designated by the user arrives and the triggering condition is satisfied, the system is cleaned according to a preset running manner and a preset running policy.

The running manner and the running policy of system cleaning can also be preset and provided to the user to choose.

Specifically, the running manner selected by the user includes: foreground running and background running.

The foreground running refers to running with an interface reaction; the background running refers to muting running or running that a corresponding prompt is provided to the user only before the system is run and after the running is ended.

The running policy selected by the user includes: a centralized cleaning policy, a stepwise cleaning policy and a policy recommended by the system by default.

The centralized cleaning policy refers to that: when the triggering condition is satisfied, the cleaning task is completed all at once.

The stepwise cleaning policy refers to that: when the triggering condition is satisfied, cleaning is made in a stepwise manner. For example, a cleaning point is completed every other period of time, and in this way, that the system occupies excessive resources due to cleaning in a period of time can be avoided.

The policy recommended by the system by default refers to that: the system analyzes the performance of the computer, selects an appropriate running policy for the user, and provides the running policy to the user to choose.

Through the foregoing solution, this embodiment of the present invention enables the user to select a triggering occasion, a triggering condition, a running manner and a running policy suitable for the user; during running, when the triggering occasion arrives and the triggering condition is satisfied, the system automatically completes system cleaning, thereby not only improving the system performance of the computer, and the system cleaning efficiency and protecting the computer security and the individual privacy, but also saving the disk space of the computer.

Figure 2:
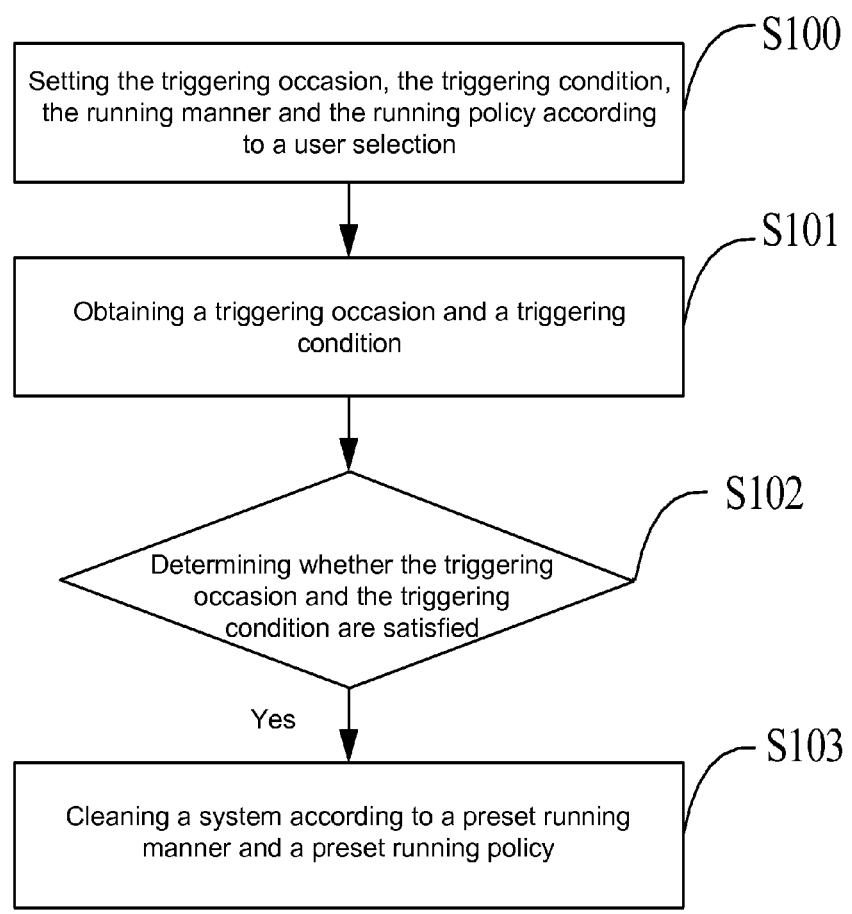
FIG. 2 is a schematic flow chart of a method for automatic system cleaning according to another embodiment of the present invention.

FIG. 2 shows a flowchart of a method for automatic system cleaning according to a second embodiment of the present invention. In the second embodiment, on the basis of the first embodiment, before executing step S101, the method further includes the following steps.

At step S100: Setting the triggering occasion, the triggering condition, the running manner and the running policy according to a user selection.

The difference between the second embodiment and the first embodiment lies in that, in this embodiment, the triggering occasion, the triggering condition, the running manner and the running policy of system cleaning can be further temporarily set according to the user selection, in which for the triggering occasion, the triggering condition, the running manner and the running policy, reference can be made to the foregoing embodiment, and other content is the same as that of the first embodiment.

In this embodiment, through combination of a system cleaning function and a scheduled task function, and expansion of an existing triggering condition of a tasks scheduler, a user can self-define a triggering occasion, a triggering condition, a running manner and a running policy of system cleaning. When the triggering occasion and the triggering condition designated by the user are satisfied, the user is helped automatically complete system cleaning according to the selected running manner and running policy, thereby saving the disk space of the computer, improving the system performance, and protecting the computer security and the individual privacy.

Figure 3:
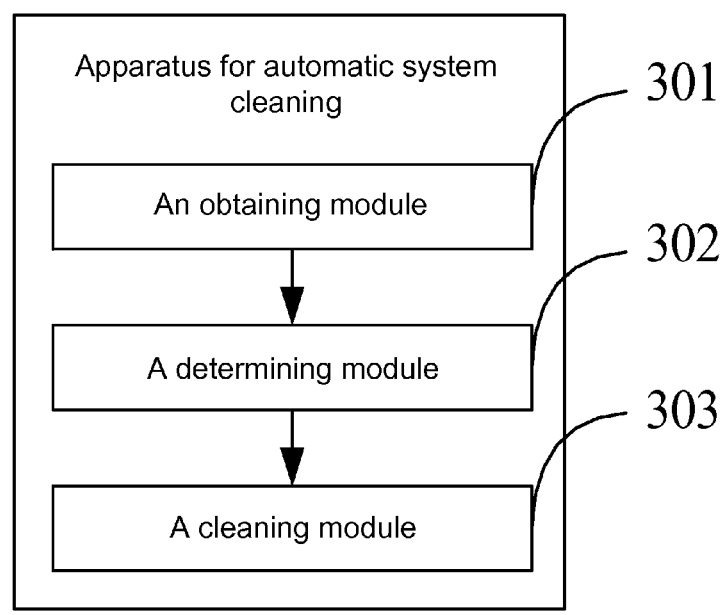
FIG. 3 is a schematic structural diagram of an apparatus for automatic system cleaning according to one embodiment of the present invention.

As shown in FIG. 3, a first embodiment of the present invention proposes an apparatus for automatic system cleaning, which includes an obtaining module 301, a determining module 302 and a cleaning module 303.

The obtaining module 301 is configured to obtain triggering occasion and a triggering condition which are selected by a user;

The determining module 302 is configured to determine whether the triggering occasion and the triggering condition are satisfied; and The cleaning module 303 is configured to clean, when the triggering occasion arrives and the triggering condition is satisfied, a system according to a preset running manner and a preset running policy.

In this embodiment, a system cleaning function is combined with a scheduled task function, and an existing triggering condition of a tasks scheduler is expanded, so the user can self-define and select a triggering occasion, a triggering condition, a running manner and a running policy of system cleaning.

The system presets several types of triggering occasions, triggering conditions, running manners and running policies for the user to choose.

The triggering occasions to be selected by the user include, but not limited to: at time when the system is started, at time after the system starting is completed, in several time intervals after the system starting is completed, before power-off, at a designated time point or period of time, and in a designated running time interval. The system cleaning is run according to the triggering occasion selected by the user.

Specifically, running at the time when the system is started includes: triggering at occasions such as time of starting after the user starts up, time after re-login after user logout, and time after switching the user to log in.

Running at the time after the system starting is completed includes: triggering at the time when the system starting is already completed, namely, triggering at the time after items such as the system startup service and the system starting are already completed.

Running in several time intervals after the system starting is completed includes: triggering after several seconds, minutes or hours after the system starting is completed.

Running before power-off includes: triggering system cleaning before system power-off or restart.

Running at a designated time point includes: running at one or more designated time points in a day, such as running at 7:20 AM.

Running at a designated running time interval includes: running every several seconds, minutes, hours or days.

Moreover, a period of time can be further designated for running, such as running on a certain designated day or several certain designated days of every week, and running on a day of the week of every week; or running on a certain designated day or several certain designated days of every month, such as running on a date of every month.

The user can select one or more of the foregoing triggering occasions to trigger system cleaning.

In this embodiment, the triggering condition selected by the user can include: whether the system is idle and whether the cleaning point condition is satisfied.

The cleaning point in the system cleaning includes, but not limited to, trashes, traces, plug-ins and disk fragments in the system.

Cleaning of the trashes refers to that: a computer generally automatically generates a temporary file or temporary information during use, such as a temporary file and an invalid shortcut of the system and the browser, and the useless or ineffective file or registry information is generally referred to as a system trash. When system trashes are excessive due to accumulation over a long period, the computer running speed is slowed down, the available space on the magnetic disk is reduced, and sometimes, normal running of the system or other software is even influenced, so it is required to clean these system trashes at regular intervals, so as to improve the system performance.

Cleaning of the traces refers to that: in a computer running procedure, for convenience of reuse of the user, the system or program frequently automatically stores historical records of user operations, such as a browsed webpage, a seen movie program, and an edited or opened document, and these records are use traces of the user. The use traces may contain individual privacy information of the user, and once another person uses the computer of the user, the individual privacy of the user may be obtained through the historical use traces. Therefore, cleaning of use traces at regular intervals can effectively protect the individual privacy, and prevent another person from understanding the Internet access operation of the user according to the use traces.

Cleaning of the plug-ins refers to that: in a computer system, certain software needs support of some plug-ins, the plug-ins are various, a standard plug-in facilitates use of a software function, while a malicious plug-in influences the software performance to a slight extent, and damages or controls, as a Trojan horse or a virus, the computer system to a serious extent. A malicious plug-in or a designated plug-in which the user does not need in the system is cleaned, so as to ensure security of the computer and the individual information.

Cleaning of the disk fragments refers to that: fragments and messy files generated by the computer magnetic disk during long-term use are rearranged through system software or professional disk fragment arrangement software, so as to release more disk spaces, and the whole performance and the running speed of the computer can be improved.

In this embodiment, the triggering condition for whether the system is idle can be set in the following manner.

If the system conforms to one or more of the following conditions in a designated time length, it can be considered that the system is idle:

no mouse operation occurs, no keyboard operation occurs, the CPU occupancy rate is stable and tends to be smooth or is lower than a designated percentage, the memory occupancy rate is lower than a designated percentage, and the system IO occupancy rate is lower than a designated percentage. The designated percentage can be set according to an actual situation.

The triggering condition for the cleaning point condition can be set in the following manner.

For a trash, if the number of trash files in a certain path satisfies a designated number, or the size of the trash files in the certain path satisfies a designated value, cleaning is triggered; or if certain designated software is exited, cleaning is triggered. For a trace, if the number of use traces reaches a certain number, cleaning is triggered; or if certain software is exited, cleaning is triggered. For a plug-in, if certain software is exited, cleaning is triggered. For disk fragments, if the occupancy rate of the number of fragments and the fragment space at a certain designated drive for a magnetic disk reaches a designated value, disk cleaning is triggered.

The user can select one or two of the foregoing triggering conditions.

Therefore, the user can self-define and select the triggering occasion and the triggering condition according to individual needs, designate a corresponding triggering occasion and a corresponding triggering condition, and can also select a default triggering occasion and a cleaning triggering condition recommended by the system.

In this embodiment, the apparatus for automatic system cleaning first obtains, through the obtaining module 301, the triggering occasion and the triggering condition selected by the user, and then judges, through the determining module 302, whether the triggering occasion and the triggering condition selected by the user satisfy the requirement.

The determination of a triggering occasion of system cleaning can be performed according to a triggering occasion designated by the user, and if the user selects several of the foregoing triggering occasions, the determination can be made according to the sequences of the triggering occasions during the determination.

For example, if the user designates a triggering occasion before system starting, running and power-off, it can be first determined whether the triggering occasion arrives at the time when the system is started; if the triggering occasion is satisfied, a triggering action is generated, and then determination is performed according to the triggering occasion designated by the user during system running, namely, at the time after the system starting is completed; if the condition is satisfied, a triggering action is generated.

As described above, in this embodiment, the triggering condition selected by the user can include: whether the system is idle and whether the cleaning point condition is satisfied.

Whether the system is idle and whether the cleaning point condition is satisfied can both be determined by scanning the system at a fixed time interval, namely, judge whether the user designated condition is satisfied according to a scanning result.

For determining whether the system is idle: first, the system is scanned at a fixed time interval; and when the system conforms to one or more of the following conditions in a predetermined time length, it is determined that the system is idle.

The foregoing conditions include that: no mouse operation occurs, no keyboard operation occurs, the CPU occupancy rate is stable and tends to be smooth or is lower than a predetermined percentage, the memory occupancy rate is lower than a predetermined percentage, and the system IO occupancy rate is lower than a predetermined percentage.

For determining whether the cleaning point condition is satisfied: first, the system is scanned at a fixed time interval; and then whether the user designated condition is satisfied is determined according to a scanning result, and the designated condition includes the following content.

For a trash, if the number of trash files in a certain path satisfies a designated number, or the size of the trash files in the certain path satisfies a designated value, cleaning is triggered; or if certain designated software is exited, cleaning is triggered. For a trace, if the number of use traces reaches a certain number, cleaning is triggered; or if certain software is exited, cleaning is triggered. For a plug-in, if certain software is exited, cleaning is triggered. For disk fragments, if the occupancy rate of the number of fragments and the fragment space at a certain designated drive for a magnetic disk reaches a designated value, disk cleaning is triggered.

The determination sequence of cleaning points such as a trash, a trace, a plug-in and a disk fragment can be set according to actual needs. For example, first whether the trash cleaning point condition satisfies the requirement can be determined, and then whether the trace cleaning point condition, the plug-in cleaning point condition and the disk fragment cleaning point condition satisfies the requirement are determined in sequence. Moreover, the specific determination can be further completed in combination with a counter and a timer.

When the triggering occasion designated by the user arrives and the triggering condition is satisfied, the cleaning module 303 cleans the system according to the running manner and the running policy which are preset.

The running manner and the running policy of system cleaning can also be preset and provided to the user to choose.

Specifically, the running manner selected by the user includes: foreground running and background running.

The foreground running refers to running with an interface reaction; the background running refers to muting running or running that a corresponding prompt is provided to the user only before the system is run and after the running is ended.

The running policy selected by the user includes: a centralized cleaning policy, a stepwise cleaning policy and a policy recommended by the system by default.

The centralized cleaning policy refers to that: when the triggering condition is satisfied, the cleaning task is completed all at once.

The stepwise cleaning policy refers to that: when the triggering condition is satisfied, cleaning is made in a stepwise manner. For example, a cleaning point is completed every other period of time, and in this way, that the system occupies excessive resources due to cleaning in a period of time can be avoided.

The policy recommended by the system by default refers to that: the system analyzes the performance of the computer, selects an appropriate running policy for the user, and provides the running policy to the user to choose.

Through the foregoing solution, this embodiment enables the user to select a triggering occasion, a triggering condition, a running manner and a running policy suitable for the user; during running, when the triggering occasion arrives and the triggering condition is satisfied, the system automatically completes system cleaning, thereby not only improving the system performance of the computer and protecting the computer security and the individual privacy, but also saving the disk space of the computer.

Figure 4:
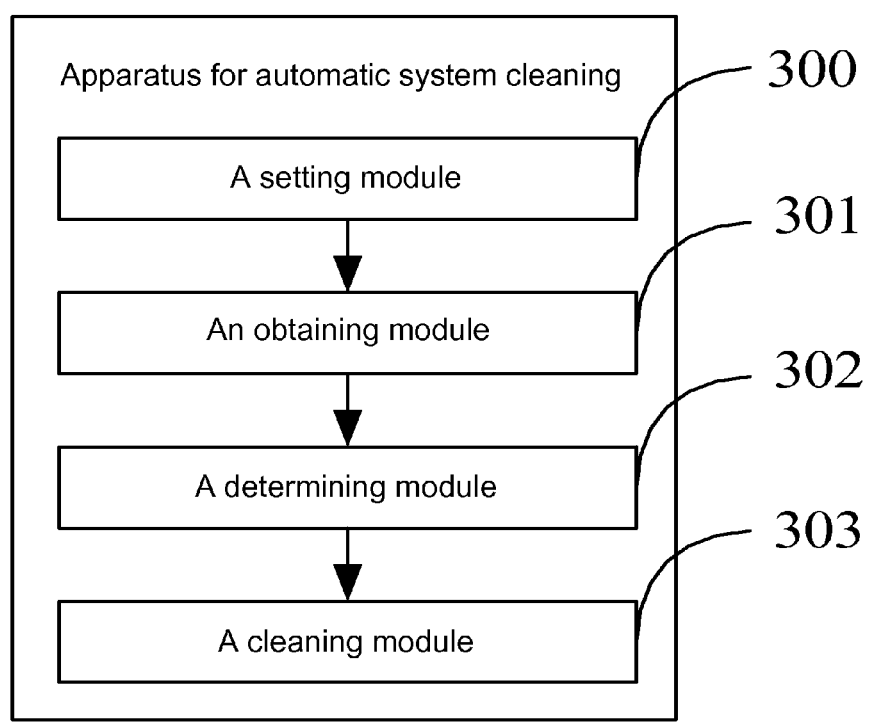
FIG. 4 is a schematic structural diagram of an apparatus for automatic system cleaning according to another embodiment of the present invention.

FIG. 4 shows schematically an apparatus for automatic system cleaning according to a second embodiment of the present invention. On the basis of the first embodiment, the apparatus further includes a setting module 300, configured to set the triggering occasion, the triggering condition, the running manner and the running policy according to a user selection.

The difference between this embodiment and the foregoing embodiment lies in that, in this embodiment, the setting module 300 can further temporarily set the triggering occasion, the triggering condition, the running manner and the running policy of system cleaning according to the user selection, in which for the triggering occasion, the triggering condition, the running manner and the running policy, reference can be made to the foregoing embodiment, and other content is the same as that of the first embodiment.

Moreover, the present invention further relates to a non-transitory tangible computer-readable medium, on which a program enabling a computer to run is stored, in which after the program is installed into a memory of the computer, a triggering occasion and a triggering condition which are selected by a user are obtained; whether the triggering occasion and the triggering condition are satisfied is determined; and if yes, a system is cleaned according to a preset running manner and a preset running policy.

In the method and the apparatus for automatic system cleaning, and the storage medium of the embodiments of the present invention, through combination of a system cleaning function and a scheduled task function, and expansion of an existing triggering condition of a tasks scheduler, a user can self-define a triggering occasion, a triggering condition, a running manner and a running policy of system cleaning. When the triggering occasion and the triggering condition designated by the user are satisfied, the user is helped automatically complete system cleaning according to the selected running manner and running policy, thereby saving the disk space of the computer, improving the system performance and the system cleaning efficiency, and protecting the computer security and the individual privacy. The non-transitory tangible computer-readable storage medium includes, but not limited to, disk, CD-ROM, read-only memory (ROM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for automatic system cleaning, comprising:
providing, by a system, a plurality of triggering occasions, a plurality of triggering conditions, a plurality of running manners, and a plurality of running policies,
wherein the plurality of triggering occasions comprises at time when the system is started, at time after the system starting is completed, in several time intervals after the system starting is completed, before power-off, at a designated time point or period of time, and in a designated running time interval, wherein the plurality of triggering conditions comprises whether the system is idle and whether a cleaning point condition is satisfied, wherein the plurality of running manners comprises a foreground running and a background running, and wherein the plurality of running policies comprises a centralized cleaning policy, a stepwise cleaning policy and a policy recommended by the system by default;

setting, by a user selection, a preset triggering occasion from the plurality of triggering occasions, a preset triggering condition from the plurality of triggering conditions, a preset running manner from the plurality of running manners, and a preset running policy from the plurality of running policies;

obtaining, by the system, the preset triggering occasion and the preset triggering condition;

determining whether the preset triggering occasion and the preset triggering condition are satisfied; and when the preset triggering occasion and the preset triggering condition are satisfied, cleaning the system according to the preset running manner and the preset running policy.

2. The method according to claim 1, wherein whether the system is idle is determined by:

scanning the system at a fixed time interval; and determining that the system is idle when the system conforms to one or more of conditions in a predetermined time length, wherein the conditions comprise that: no mouse operation occurs, no keyboard operation occurs, the CPU occupancy rate is stable and tends to be smooth or is lower than a predetermined percentage, the memory occupancy rate is lower than a predetermined percentage, and the system IO occupancy rate is lower than a predetermined percentage.

3. The method according to claim 1, wherein whether the cleaning point condition is satisfied is determined by:

scanning the system at a fixed time interval; and performing the following determination according to the scanning result:

for a trash cleaning point, if a number of trash files in a predetermined path satisfies a designated number, or a size of the trash files in the predetermined path satisfies a designated value, triggering cleaning; or if designated software is exited, triggering cleaning; and/or for a trace cleaning point, if a number of use traces reaches a predetermined number, triggering cleaning; or if predetermined software is exited, triggering cleaning; and/or for a disk fragment cleaning point, if the occupancy rate of a number of fragments and a fragment space at a designated drive for a magnetic disk reaches a predetermined value, triggering disk cleaning.

4. The method according to claim 3, wherein the step of cleaning the system according to the preset running manner and the preset running policy comprises:

in the foreground running or the background running manner, completing a cleaning task all at once, or completing a cleaning point every other predetermined period of time, or cleaning the system according to a preset default policy.

5. An apparatus for automatic system cleaning, comprising a processor and a memory storing computer executable code, wherein the computer executable code, when executed at the processor, is configured to:

provide a plurality of triggering occasions, a plurality of triggering conditions, a plurality of running manners, and a plurality of running policies, wherein the plurality of triggering occasions comprises at time when the system is started, at time after the system starting is completed, in several time intervals after the system starting is completed, before power-off, at a designated time point or period of time, and in a designated running time interval, wherein the plurality of triggering conditions comprises whether the system is idle and whether a cleaning point condition is satisfied, wherein the plurality of running manners comprises a foreground running and a background running, and wherein the plurality of running policies comprises a centralized cleaning policy, a stepwise cleaning policy and a policy recommended by the system by default;

set a preset triggering occasion selected by a user from the plurality of triggering occasions, a preset triggering condition selected by the user from the plurality of triggering conditions, a preset running manner selected by the user from the plurality of running manners, and a preset running policy selected by the user from the plurality of running policies;

obtain the preset triggering occasion and the preset triggering condition;

determine whether the preset triggering occasion and the preset triggering condition are satisfied; and clean, when the preset triggering occasion arrives and the preset triggering condition is satisfied, the system according to the preset running manner and the preset running policy.

6. The apparatus according to claim 5, wherein the computer executable code, when executed at the processor, is further configured to:

scan the system at a fixed time interval; and determine, when the system conforms to one or more of conditions in a predetermined time length, that the system is idle, wherein the conditions comprise that: no mouse operation occurs, no keyboard operation occurs, the CPU occupancy rate is stable and tends to be smooth or is lower than a predetermined percentage, the memory occupancy rate is lower than a predetermined percentage, and the system IO occupancy rate is lower than a predetermined percentage.

7. The apparatus according to claim 5, wherein the computer executable code, when executed at the processor, is further configured to scan the system at a fixed time interval; and perform the following determination according to the scanning result:

for a trash cleaning point, if a number of trash files in a predetermined path satisfies a designated number, or a size of the trash files in the predetermined path satisfies a designated value, triggering cleaning; or if designated software is exited, triggering cleaning; and/or for a trace cleaning point, if a number of use traces reaches a predetermined number, triggering cleaning; or if predetermined software is exited, triggering cleaning; and/or for a disk fragment cleaning point, if the occupancy rate of a number of fragments and a fragment space at a designated drive for a magnetic disk reaches a predetermined value, triggering disk cleaning.

8. The apparatus according to claim 7, wherein the computer executable code, when executed at the processor, is further configured to, in the foreground running or the background running manner, complete a cleaning task all at once, or complete a cleaning point every other predetermined period of time, or clean the system according to a preset default policy.

9. A non-transitory computer-readable medium storing instructions that enable a computer to run, which, when executed by one or more processors of the computer, cause the computer to perform a method for automatic system cleaning, the method comprising:
providing a plurality of triggering occasions, a plurality of triggering conditions, a plurality of running manners, and a plurality of running policies,
wherein the plurality of triggering occasions comprises at time when the computer is started, at time after the computer starting is completed, in several time intervals after the computer starting is completed, before power-off, at a designated time point or period of time, and in a designated running time interval,
wherein the plurality of triggering conditions comprises whether the computer is idle and whether a cleaning point condition is satisfied,
wherein the plurality of running manners comprises a foreground running and a background running, and
wherein the plurality of running policies comprises a centralized cleaning policy, a stepwise cleaning policy and a policy recommended by the computer by default;
setting, by a user selection, a preset triggering occasion from the plurality of triggering occasions, a preset triggering condition from the plurality of triggering conditions, a preset running manner from the plurality of running manners, and a preset running policy from the plurality of running policies;
obtaining the preset triggering occasion and the preset triggering condition;
determining whether the preset triggering occasion and the preset triggering condition are satisfied; and
when the preset triggering occasion and the preset triggering condition are satisfied, cleaning the computer according to the preset running manner and the preset running policy.

10. The non-transitory computer-readable medium according to claim 9, wherein whether the computer is idle is determined by:
scanning the computer at a fixed time interval; and
determining that the computer is idle when the computer conforms to one or more of conditions in a predetermined time length, wherein the conditions comprise that: no mouse operation occurs, no keyboard operation occurs, the CPU occupancy rate is stable and tends to be smooth or is lower than a predetermined percentage, the memory occupancy rate is lower than a predetermined percentage, and the computer TO occupancy rate is lower than a predetermined percentage.

11. The non-transitory computer-readable medium according to claim 9, wherein whether the cleaning point condition is satisfied is determined by:
scanning the computer at a fixed time interval; and
performing the following determination according to the scanning result:
for a trash cleaning point, if a number of trash files in a predetermined path satisfies a designated number, or a size of the trash files in the predetermined path satisfies a designated value, triggering cleaning; or if designated software is exited, triggering cleaning; and/or
for a trace cleaning point, if a number of use traces reaches a predetermined number, triggering cleaning; or if predetermined software is exited, triggering cleaning; and/or
for a disk fragment cleaning point, if the occupancy rate of a number of fragments and a fragment space at a designated drive for a magnetic disk reaches a predetermined value, triggering disk cleaning.

12. The non-transitory computer-readable medium according to claim 11, wherein the step of cleaning the computer according to the preset running manner and the preset running policy comprises:
in the foreground running or the background running manner, completing a cleaning task all at once, or completing a cleaning point every other predetermined period of time, or cleaning the computer according to a preset default policy.

* * * * *